United States Patent
Dicker et al.

(10) Patent No.: US 10,395,333 B2
(45) Date of Patent: Aug. 27, 2019

(54) HIERARCHICAL SELECTION PROCESS

(71) Applicant: Uber Technologies, Inc., San Francisco, CA (US)

(72) Inventors: Russell Dicker, Seattle, WA (US); Qinming Fang, Seattle, WA (US); Vincent Yates, Seattle, WA (US); Thomas Fallows, San Francisco, CA (US); Marc Pottier, Seattle, WA (US); Michael Reckhow, Mercer Island, WA (US)

(73) Assignee: Uber Technologies, Inc., San Francisco, CA (US)

( * ) Notice: Subject to any disclaimer, the term of this patent is extended or adjusted under 35 U.S.C. 154(b) by 65 days.

(21) Appl. No.: 15/615,754

(22) Filed: Jun. 6, 2017

(65) Prior Publication Data

US 2017/0352125 A1 Dec. 7, 2017

Related U.S. Application Data

(60) Provisional application No. 62/347,043, filed on Jun. 7, 2016.

(51) Int. Cl.
*G06Q 50/30* (2012.01)
*G06Q 10/10* (2012.01)
*G06Q 30/02* (2012.01)

(52) U.S. Cl.
CPC ......... *G06Q 50/30* (2013.01); *G06Q 10/1097* (2013.01); *G06Q 30/0206* (2013.01); *G06Q 30/0208* (2013.01)

(58) Field of Classification Search
CPC ........... G06Q 10/1097; G06Q 30/0206; G06Q 30/0208; G06Q 50/30

USPC ........................................................ 705/7.21
See application file for complete search history.

(56) References Cited

U.S. PATENT DOCUMENTS

| | | | | |
|---|---|---|---|---|
| 4,023,753 | A * | 5/1977 | Dobler | B61L 23/005 246/122 R |
| 5,953,706 | A * | 9/1999 | Patel | G06Q 10/025 705/6 |
| 7,840,427 | B2 * | 11/2010 | O'Sullivan | G06Q 10/00 340/988 |
| 9,939,279 | B2 * | 4/2018 | Pan | G01C 21/3438 |
| 2001/0037174 | A1 * | 11/2001 | Dickerson | G07B 15/00 701/400 |
| 2004/0225520 | A1 | 11/2004 | Aoki et al. | |
| 2005/0278192 | A1 | 12/2005 | Cantini et al. | |
| 2006/0293937 | A1 * | 12/2006 | Sohm | G06Q 10/063116 705/7.16 |

(Continued)

OTHER PUBLICATIONS

"How does Uber work?" available at https://help.uber.com/h/738d1ff7-5fe0-4383-b34c-4a2480efd71e (Year: 2016).*

(Continued)

*Primary Examiner* — Folashade Anderson
(74) *Attorney, Agent, or Firm* — Mahamedi IP Law LLP

(57) ABSTRACT

A network system can communicate with a user device and receive a set of request data for a scheduled request at a scheduled date and a scheduled time. The set of request data indicates a start location and a destination location for the scheduled request. The network system can record the scheduled request in a scheduling log, and implement a hierarchical selection process to fulfill the scheduled request.

18 Claims, 9 Drawing Sheets

(56) References Cited

U.S. PATENT DOCUMENTS

| | | |
|---|---|---|
| 2008/0177584 A1 | 7/2008 | Altaf et al. |
| 2009/0030885 A1* | 1/2009 | DePasquale ........... G06Q 10/02 |
| 2010/0153279 A1* | 6/2010 | Zahn ...................... G06Q 10/02 |
| | | 705/80 |
| 2010/0211498 A1 | 8/2010 | Aabye et al. |
| 2011/0225257 A1 | 9/2011 | Tilden et al. |
| 2011/0251951 A1 | 10/2011 | Kolkowitz et al. |
| 2012/0072249 A1 | 3/2012 | Weir et al. |
| 2013/0018795 A1 | 1/2013 | Kolhatkar et al. |
| 2014/0025410 A1 | 1/2014 | Churchman et al. |
| 2014/0149157 A1 | 5/2014 | Shaam et al. |
| 2014/0172727 A1* | 6/2014 | Abhyanker ............ G06Q 50/30 |
| | | 705/307 |
| 2015/0032485 A1* | 1/2015 | Nelson ................... G06Q 10/02 |
| | | 705/5 |
| 2015/0161554 A1* | 6/2015 | Sweeney ........ G06Q 10/063114 |
| | | 705/7.15 |
| 2015/0176997 A1* | 6/2015 | Pursche ............... G08G 1/0967 |
| | | 340/905 |
| 2015/0206267 A1* | 7/2015 | Khanna .................. G06Q 50/30 |
| | | 705/5 |
| 2016/0138928 A1* | 5/2016 | Guo .................... G01C 21/3438 |
| | | 701/537 |
| 2016/0148167 A1* | 5/2016 | Li .......................... G06Q 10/10 |
| | | 705/7.19 |
| 2017/0169366 A1* | 6/2017 | Klein ................... G06Q 10/025 |

OTHER PUBLICATIONS

ISR and Written Opinion dated Sep. 14, 2017 in PCT/US2017/036430.

Introducing Scheduled Rides: Plan Your Trip in Advance—Lyft Blog; https://blog.lyft.com/posts/introducing-scheduled-rides, May 23, 2016.

* cited by examiner

Scheduled Ride
Input Screen
414

Input Window(s)
416

HIERARCHICAL SELECTION PROCESS

CROSS REFERENCE TO RELATED APPLICATION

This application claims the benefit of priority to U.S. Provisional Application No. 62/347,043, entitled "TRANSPORT SCHEDULING AND FACILITATION SYSTEM," and filed on Jun. 7, 2016, which is hereby incorporated by reference in its entirety.

BACKGROUND

On-demand transport services can provide a platform connecting available transport providers with requesting users using designated applications executing on mobile devices. Typically, users make requests at the time a transport service is needed, and a network system arranges the transport service to be provided by an available transport provider.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
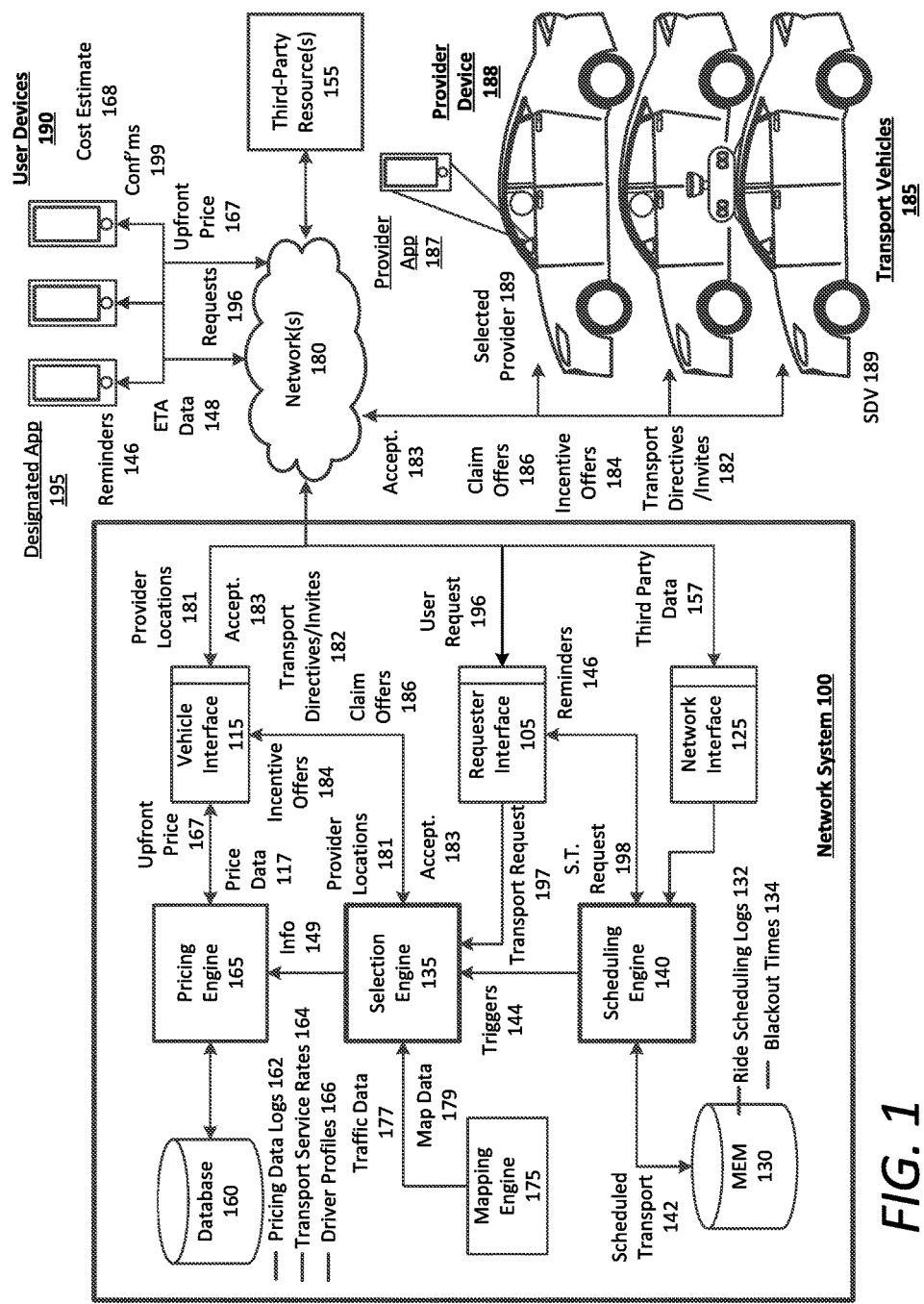
FIG. 1 is a block diagram illustrating an example transport network system in communication with user devices and a fleet of transport providers, as described herein.

A network system is disclosed herein that can provide a ride scheduling feature for a designated application of an on-demand transportation service. According to examples described herein, the ride scheduling feature can enable users to schedule future rides with the on-demand transportation service—which can be managed by the network system. The network system can receive user requests for scheduled transport requests, where the user can input a future time for service (e.g., a scheduled future date and/or time, as compared to the current time), a start location, and a destination. In certain implementations, the network system can manage a ride or transport service scheduling log (referred to herein as scheduling log) including all scheduled transport services for a given region.

In many examples, the network system can also manage the on-demand transport service by connecting requesting users with available transport providers and/or autonomous vehicles (AVs) operating throughout the given region. In doing so, the network system can receive user requests for transportation from requesting users via a designated application executing on the users' mobile computing devices. Based on an inputted start location, the network system can identify a number of proximate available transport providers and transmit a transport invitation (e.g., an interactive notification) to one or more transport provider devices of the proximate available transport providers to service the transport request. In many examples, the transport providers s can either accept or decline the invitation based on a variety of reasons, for example, the route being too long or having a destination that is impractical for the transport provider. In certain variations, one or more of the proximate available transport providers can comprises an AV, and thus the network system can transmit a transport directive instructing a most optimal SDV to service the transport request.

When nearing the scheduled time for transport, the network system can select and/or transmit a transport invitation to an optimal transport provider to service the scheduled transport request and transmit a confirmation to the user device via the designated application that the optimal vehicle is selected and/or traveling to the start location. As used herein, the term "optimal" transport provider can include a closest proximate transport provider or vehicle in relation to the start location that accepts the transport invitation. As such, an actual closest proximate available transport provider may decline the invitation, which can cause the network system to perform a number of backup options, such as selecting a next best option, or failing over to an alternative service type (e.g., a black car service if normal peer-to-peer options are unavailable). Thus, the "optimal" transport provider can comprise a best available option given the transport providers' ability to decline a transport invitation or directive. The network system can perform a hierarchical selection process when a series of rejections are received in order to converge on an optimal transport provider to ultimately service the scheduled transport request. Examples described herein recognize that non-fulfillment of a scheduled transport service can cause consumer distrust and significant inconvenience, and therefore extending backup options (described in detail herein) can provide assurances that each scheduled transport request is serviced within tolerable time constraints, despite having to resort to backup options.

In many examples, the network system can compile historical pricing data for individual trips executed throughout the given region. Such pricing data can be compiled for every trip utilizing the core on-demand transport services as well as the scheduled transport services described herein. In some examples, the network system can utilize the historical pricing data to determine an upfront price for a scheduled transport request for a requesting user. The upfront price can further be based on the scheduled date, the scheduled time, the start location, and the destination indicated in the scheduled transport request. In some examples, the historical pricing data can include surge pricing data for time windows in specified areas of the given region based on driver supply versus user demand.

Furthermore, various additional factors may be considered by the network system in determining the upfront price, such as accessing a weather resource to determine likely weather conditions for the future date and time, accessing event schedules for the given region to determine whether a particular event (e.g., a sporting event, a concert, road construction, etc.) will coincide with the scheduled ride. Accordingly, given all such factors as historical pricing data for similar rides, timing data indicating historical supply/demand price surging, weather forecast data for the scheduled ride, scheduled road construction or maintenance, and/or event data corresponding to the scheduled transport request, the network system can filter the compiled pricing data to determine the upfront price for the scheduled transport request. In many examples described herein, the upfront price can comprise a guaranteed cost for the scheduled ride to the user based on the historical pricing data, whereas the network system can provide payment to a transport provider of the optimal vehicle for the scheduled ride based on time and distance traveled in servicing the scheduled ride.

In certain implementations, the network system may require a certain confidence level with regard to offering the upfront price to requesting users. For example, for each scheduled ride, the network system can perform a price optimization based on the foregoing inputs to determine the upfront price and calculate a probability that the actual cost (e.g., including payment to the driver) will be within a predetermined error range of the upfront price (e.g., >95% probability that the actual cost will be within $0.50 of the upfront price offered). Accordingly, if the probability calculation is not within the acceptable tolerances, the network system can schedule the transport request to include normal trip pricing for the on-demand transportation service (e.g., based on time and distance traveled).

According to some examples, when variances in factors for predicting upfront prices (e.g., based on uncertain weather conditions, historical pricing data, scheduled events, etc.) cause probability calculations for upfront prices to exceed certainty thresholds for a particular area or sub-region, the network system can input blackout periods for such areas or sub-regions in which scheduled rides and/or upfront pricing is unavailable. For example, certain rare events in a given sub-area may cause uncertainty in driver supply and/or SDV supply, such that the network system may be unable to provide a guarantee (or near-guarantee) of transport facilitation. Given that non-fulfillment of scheduled rides can result in significant consumer inconvenience or disappointment, the network system may black out the scheduling service for such uncertain time periods in those sub-regions.

In certain variations, the network system can provide an incentive to "move supply" when proximate available transport providers are lacking for a particular upcoming scheduled ride. For example, prior to the scheduled time for start (e.g., 30 minutes prior), the network system can perform a lookup of estimated time of arrival (ETA) information based on driver device locations and/or SDV locations to identify that the scheduled start location is relatively remote from the driver and/or SDV supply. According to some examples, the network system can generate and transmit an offer incentive to transport provider devices to travel to the start location or closer to the start location in order to ensure that the scheduled ride is serviced. The offer incentive can comprise set monetary offer, an initiation of a fare meter to compensate the driver for traveling to the start location, a service bonus or credit, and the like.

As described herein, the network system can provide a plurality ride service options, such as a peer-to-peer ride service option, a ride pool service option, a luxury ride service option, a large vehicle ride service option, a professional ride service option, and the like. Each service option can comprise a different fare calculation and can include drivers and/or vehicles that meet certain requirement. For example, a luxury ride service option can guarantee a luxury type vehicle of a particular quality, brand, year, etc., but may be driven by an ordinary peer-to-peer driver. As another example, the professional ride service option can guarantee a credentialed driver and a certain vehicle type (e.g., a professional driver and/or a black car, such as a limousine). In inputting the user request for a scheduled ride, the user can request a particular ride type. Accordingly, when the scheduled ride time approaches, the network system can begin transmitting transport invitations to drivers of the requested ride type. In many examples, the request will be accepted, in which case the scheduled ride will be services successfully. However, in the event that the invitation is not accepted by any proximate available vehicles of the particular ride type (e.g., based on an ETA threshold), the network system can fail over to an alternative ride type option. Thus, in this case, the network system can look up ETA information from drivers and/or SDVs of an alternative ride type and begin transmitting transport directives to proximate available drivers or vehicles until the scheduled ride is accepted.

Furthermore, given the schedule intensive nature of the scheduled ride service, the network system can provide compensation schemas for both requesting users and drivers based on lateness and/or cancelations by both driver and requesting user. In one example, the network system can monitor the selected vehicle via, for example, location-based resources (e.g., global positioning system (GPS) resources) of the driver's mobile computing device to identify when the optimal vehicle arrives at the start location. If the scheduled start time has passed and the vehicle has arrived at the start location, this may indicate that the requesting user is late. In order to compensate the transport provider for the loss of time, the network system can initiate a fare meter for the scheduled ride as the driver awaits the requesting user at the start location.

Additionally or alternatively, the driver and/or requesting user may cancel the scheduled ride without charge up until a certain time prior to the scheduled start time (e.g., until a driver accepts the scheduled ride). Thereafter, the network system can initiate a cancelation fee rate calculation that progresses as the scheduled time for start approaches. Such a feature can essentially transfer funds between the connected driver and requesting user based on inconvenience, fuel or energy costs, and/or wasted time.

Among other benefits, the examples described herein achieve a technical effect of combining ride scheduling services with an on-demand transport service platform. The disclosed transport coordination system can leverage an existing on-demand transportation arrangement platform, in which ETA data may be utilized to invite drivers or proximate SDVs to service a scheduled ride as the start time approaches. Furthermore, since historical pricing data is available for rides throughout a given region based on the on-demand service, the network system may provide upfront pricing for a scheduled ride to give the requesting user a guaranteed price for the scheduled ride. Still further, because the on-demand ride service can provide multiple different ride service options, the network system can implement a failover process, or utilize alternative ride service types as backup options, if a requested ride service type is unavailable or impracticable.

As used herein, a computing device refers to devices corresponding to desktop computers, cellular devices or smartphones, personal digital assistants (PDAs), laptop computers, tablet devices, virtual reality (VR) and/or augmented reality (AR) devices, wearable computing devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as those carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Numerous examples are referenced herein in context of an autonomous vehicle (AV) or self-driving vehicle (SDV). An AV or SDV refers to any vehicle which is operated in a state of automation with respect to steering and propulsion. Different levels of autonomy may exist with respect to AVs and SDVs. For example, some vehicles may enable automation in limited scenarios, such as on highways, provided that drivers are present in the vehicle. More advanced AVs and SDVs can drive without any human assistance from within or external to the vehicle.

System Description

FIG. 1 is a block diagram illustrating an example network system in communication with user devices and a fleet of transport providers, as described herein. The network system 100 can include a requester interface 105 in communication with user devices 190 executing a designated application 195 over one or more networks 180. The network system 100 can further include a vehicle interface 115 to communication with any number of vehicles 185 operating throughout a given region (e.g., a metropolitan area such as New York City or the San Francisco Bay Area). In some aspects, the network system 100 can communicate with human drivers of such vehicles over the network(s) 180 via the drivers' devices 188 (e.g., mobile computing devices executing a designated provider application 187). Additionally or alternatively, the network system 100 can communicate with any number of self-driving vehicles (SDVs) 189 operating throughout the given region to service start requests.

According to examples described herein, a user of a particular user device 190 can input sets of data indicating user requests 196 in connection with the transportation services managed by the network system 100. Such user requests 196 can be in the form of an on-demand transport request 197, indicating that the user wishes to request immediate or near-immediate pick-up. The transport request 197 can include a start location, which the network system 100 can utilize to service the transport request 197.

Specifically, the network system 100 can include a selection engine 135 which can process the transport request 197 to determine a set of proximate available transport providers utilizing the start location and the locations of transport providers 181 operating throughout the given region. The scheduling engine 135 can receive the provider locations 181 utilizing the location based resources (e.g., GPS resources) of the driver devices 188. Thus, for on-demand ride services, the network system 100 can determine a set of proximate available transport providers in relation to the start location included in the transport request 197, and generate and transmit transport invitations or directives 182 to optimal transport providers or SDVs (e.g., a closest driver or SDV in relation to the start location). As described herein, the transport provider can input an acceptance 183 of the transport invitation 182 via the designated provider application 187 and thus drive to the start location to rendezvous with the requesting user. For SDV implementations, the transport invitation 182 may be in the form of a directive instructing the SDV 189 to autonomously drive to the start location to rendezvous with the requesting user.

As provided herein, the network system 100 can manage several different ride service types, such as a peer-to-peer ride service option, a ride pool service option, a luxury ride service option, a large vehicle ride service option, a professional ride service option, and the like. In submitting the on-demand start request 197, the user can further specify a ride service type, which the selection engine 135 can utilize as a filter for the received provider locations 181. In some examples, the user can scroll through the different transport service types on the designated application 195. The network system 100 can provide dynamic ETA data 148 to the user device 190 indicating an estimated time of arrival for one or more available transport providers of that particular type. For example, the provider locations 181 can be filterable by the selection engine 135 based on the vehicle type and/or service type for which the vehicle is qualified. Along these lines, the selection engine 135 can utilize map data 179 and/or traffic data 177 from a mapping engine 175, and the provider locations 181 of the various vehicles 185 operating throughout the given region, to provide the user with the ETA data 148 for each scrolled service type. Thus, if a start request 197 indicates a service type, the selection engine 135 can filter through the vehicles 185 proximate to the start location in order to transmit one or more transport invitations or directives 182 to only those vehicles that satisfy the characteristics of the specified service type.

The network system 100 can correlate each ride service type to a different fare calculation. For example, a ride pool service option can be correlated with a lowest fare calculation, whereas a professional ride service option can be correlated with a highest fare calculation. Accordingly, the network system 100 can include a pricing engine 165 that can provide an estimated cost range 168 for a requested ride based on historical pricing data 162 in a database 160, the specified ride service type in the start request 197, current or estimated traffic conditions indicated in the traffic data 177, and a proposed route between the start location and an inputted destination indicated in the transport request 197. In some examples, the user can accept the ride service based on the estimated cost range 168 determined by the pricing engine 165.

In additional to providing the on-demand transport arrangement services, the network system 100 can further provide a scheduled transport service option through the designated application 195. As provided herein, the scheduled transport feature can be selected by a user to input a set of data corresponding to a user request 196 in the form of a scheduled transport request 198. The network system 100 can include a scheduling engine 140 that can manage a set of ride scheduling logs 132 in memory 130 in order to facilitate administration of the scheduled transport service.

In various implementations, the network system 100 can further include a network interface 125 that enables access to a number of third party resources 155, such as websites, event calendars for the given region, weather forecasting resources, public works resources indicating road construction, calendar resources (e.g., indicating holidays), airport or airline calendars indicating saturated flight periods, and other third-party sources that can indicate localized traffic and future demand for transport services for certain sub-regions throughout the given region. In some examples, the scheduling engine 140 can utilize the third-party data 157 from the resources 155 to input blackout times 134 in the scheduling logs 132, in which the network system 100 does not offer the scheduled transport service. For example, the third-party data 157 can indicate high potential variance in transport service demands due to a sporting event, a concert, a holiday, a time of day, a time of week, a holiday, etc., and any combination of factors that may increase the potential variance. Thus, in determining the blackout times 134, the scheduling engine 140 can calculate a certainty probability of transport service demand for sub-regions within the given region based, at least in part, on the third-party data 157, and if uncertainty exceeds a certain threshold (e.g., 15% uncertainty), the scheduling engine 140 can blackout a time period for that sub-region. Alternatively, the third-party data 157 indicating potential variance in transport service demand can be ultimately utilized by the pricing engine 165 in providing an upfront price 167 for a particular scheduled ride request 198, as described in further detail below.

Upon receiving a scheduled transport request 198, the scheduling engine 140 can input data indicating a scheduled transport 142 into the scheduling logs 132 for the requesting user. In certain implementations, the scheduled transport 142 can include a start location, a destination, and a start time and start date. In further implementations, the scheduled transport 142 can also indicate a transport service type offered by the network system 100. According to examples described herein, the scheduled transport service can be offered up to a predetermined amount of time in advance of the scheduled transport request 198 (e.g., two weeks or a month). Thus, in one example, the scheduling logs 132 need only be managed by the scheduling engine 140 up to the predetermined amount of time. Furthermore, in certain implementations, the requesting user can edit the scheduled transport 142 up until a certain amount of time prior to the scheduled start time. The scheduling engine 140 can process such edits accordingly in the scheduling logs 132.

In certain implementations, the scheduling engine 140 and selection engine 135 can coordinate to generate a claim offer 186 for the scheduled ride 142, and transmit the claim offer 186 to one or more select drivers based on any number of factors. In various aspects, the characteristics of the scheduled ride 142 can enable the selection engine 135 to identify a set of optimal drivers that may be interested in claiming the scheduled ride 142. For example, the start time and start location can be correlated to a home location of a driver that is within a certain proximity of the start location. If the start time is within a certain time range of a typical on-duty start time of the driver (e.g., within thirty minutes), then the selection engine 135 can provide the claim offer 186 to the driver at any time prior to the start time (or a predetermined time prior to the start time, as described herein).

The database 160 can store driver profiles 166 that can indicate the home locations of the drivers (e.g., the driver's address), preferred operating areas (e.g., either inputted by the driver or inferred by the network system 100 over time), the driver's service rating and/or safety rating, the driver's history of claiming and delivering on claimed rides (e.g., a failed claim rate), the driver's cancelation rate, and the like. Based on such profile information, the selection engine 135 can determine one or more drivers that would be optimally suited to claim the scheduled transport 142. In some aspects, the selection engine 135 can further include an incentive or bonus payment with the claim offer 186 to further incentivize the driver to claim the scheduled transport 142. In one example, the selection engine 135 can provide an initial claim offer 186, and gradually provide increased incentives until the scheduled transport 142 is claimed.

According to various examples, the selection engine 135 can provide the claim offer 186 immediately after receiving a scheduled transport request 198 (e.g., upon performing a selection optimization to identify one or more optimal candidate drivers to service the scheduled ride), or can perform a subsequent analysis to determine whether another driver may be more optimally suited to service the scheduled transport 142. For example, the selection engine 140 can attribute weightings to certain factors, such as the driver's home location, typical operation times or on-duty times, common operational areas, the driver's safety and/or service rating, the driver's cancelation rate, and/or the driver's claimant failure rate (e.g., a rate at which the driver claims a scheduled transport 142 but fails to deliver.

Based on such weightings and the characteristics of the scheduled transport 142 (e.g., start location, destination, start time, service type, etc.), the selection engine 135 can converge on one or more most optimal drivers to which the claim offer 186 is to be provided. The driver(s) can either accept or decline the claim offer 186 accordingly. Upon accepting the claim offer 186, the network system 100 can conditionally bind or associated the claimant or accepting driver to the scheduled transport 142. When the start time approaches, the network system 100 can monitor the provider device 188 of the driver (e.g., via the provider app 187) to determine whether the driver is on-duty and/or available to service the scheduled transport 142. In order to ensure that the scheduled transport 142 is serviced, the network system 100 can decouple or disassociate the claimant transport provider from the scheduled ride 142 if the driver is not online or on-duty (or otherwise unavailable) within a predetermined, specified time prior to the scheduled transport 142 (e.g., fifteen minutes prior). In certain examples, the specified time can vary based on a sparsity factor of the scheduled transport 142.

For example, if the start location is in a sparse network of servicing drivers (e.g., a rural town), the network system 100 can increase the specified decouple time to ensure enough time for an on-demand transport provider to arrive by the scheduled start time. Conversely, if the start location is within a dense driver network (e.g., in a downtown city location), then the network system 100 can decrease the specified decouple time accordingly. In various examples, the decouple time can be provided to the claimant transport provider via push notifications to the provider device 188 (e.g., agnostic of whether the provider app 187 is executing or not). Accordingly, the decouple time can be dynamically determined based on the sparsity of the driver network surrounding the start location prior to the start time.

If the claimant transport provider is available and online, then the transport coordination system 100 can transmit a confirmation request to the provider device 188 of the claimant transport provider to confirm that the claimant transport provider will service the scheduled transport request 198. The network system 100 can then monitor the progress of the claimant transport provider to ensure that the scheduled transport request 198 is fulfilled. However, at the predetermined decouple time, if the claimant transport provider is not available, then the network system 100 can decouple or otherwise disassociate the claimant transport provider from the scheduled transport request 198 and perform a standard on-demand matching and selection process (e.g., a default selection process based on location and/or estimated time of arrival of a candidate set of drivers from the start location). Accordingly, initially providing the claim offer 186 for the scheduled transport request 198 and including a set of fall back options (e.g., failing over to the default selection process, and/or a different transport service option) can comprise a hierarchical selection process implemented by the network system 100, as described herein.

As the scheduled time for the scheduled transport 142 approaches, the scheduling engine 140 can generate and transmit a sequence of reminders 146 to the user device 190. For example, the scheduling engine 140 can generate a first reminder 146 exactly one day prior to the scheduled transport time, a second reminder two hours prior, and a final reminder thirty minutes prior to the transport time. In some examples, the reminders 146 can be generated as push notifications that can wake up the user device 190 if it is in a low power mode, or overlay displayed content. In one aspect, the user can utilize the reminder 146 to either confirm the scheduled transport 142 or cancel the scheduled transport 142, in which case the scheduling engine 140 can flush the scheduled transport 142 entry from the ride scheduling logs 132.

Furthermore, the scheduling engine 140 can generate triggers 144 for the selection engine 135 to initiate a search of proximate available transport providers (e.g., of the transport service type indicated in the scheduled transport request 198) in relation to the scheduled start location. For example, thirty minutes prior to the scheduled start time, the selection engine 135 can be triggered to filter the available transport providers 185 based on the requested service type, utilize the provider locations 181 of matching service type vehicles to identify a number of candidate transport providers proximate to the start location, and utilize map data 179 and/or traffic data 177 from the mapping engine 175 to estimate a time of arrival for each of the candidate transport providers. In one aspect, the selection engine 135 can continue to monitor the ETA information for all available transport providers entering a geo-fenced area—generated by the selection engine 135 to surround the start location—up until the ETA information for a current candidate set of available transport providers substantially correlates to the time delta to the scheduled start time. In variations, the selection engine 135 can identify that sufficient supply exists (e.g., more than five available vehicles within a ten minute ETA of the start location), and can place the search on standby for the next time trigger 144 from the scheduling engine 140. Such triggers 144 may be initiated by the scheduling engine 140 in accordance with a trigger schedule, such as every five minutes.

In response to a given trigger 144, the selection engine 135 can set a geo-fence around the start location in the scheduled transport request 198 and identify available transport providers based on provider locations 181 within the geo-fence. As provided herein, the geo-fence may be based on a set area surrounding the start location, and/or estimated arrival times of available transport providers using map data 179 and/or traffic data 177 in proximity to the start location. Additionally, the selection engine 135 can filter the available transport providers based on the requested transport service type (e.g., a peer-to-peer ride, a professional transport service, etc.). According to examples described herein, once the ETA information of the available transport providers (e.g., two or three transport providers within a ten minute ETA) substantially coincides with the countdown time to the scheduled start time (e.g., start time minus eight minutes), the selection engine 135 can generate a transport invitation 182, and transmit the transport invitation 182 to a provider device 188 of one or more of the proximate available transport providers. If one of the transport providers transmits an acceptance 183, the selection engine 135 can generate and transmit a confirmation 199 comprising information corresponding to the selected transport provider 189 to the user device 190 of the requesting user.

In certain implementations, the pricing engine 165 can initiate a logical fare meter for each serviced transport request 197 throughout the given region. The fare meter can be based on individual transport service rates 164 for transport types, and can calculate the overall fare for a given ride or service transport based distance and/or time traveled from the start location to the destination. In many implementations, the pricing engine 165 initiates the fare meter once the transport provider arrives at the start location and the requesting user enters the provider's vehicle, and terminates the fare meter upon arrival at the destination. According to such implementations, the overall fare is unknown to the requesting user until drop-off, at which point the pricing engine 165 can submit a receipt or bill to the requesting user's device 190 via the designated application 195. Thus, the pricing engine 165 can monitor the provider location 181 of the transport provider Over time, the pricing engine 165 can collect price data 117 for various individual transport requests 197 serviced throughout the given region, and catalog the historical price data 117 in pricing data logs 162 in a database 160 of the network system 100. In accordance with examples described herein, the pricing data logs 162 can be chronicled based on any of the following: the transport route, time of day, day of the week, day of the month (e.g., whether the transport request 197 was on a holiday), transport service type, whether surge conditions applied (i.e., limited supply in relation to transport demand), the surge pricing factor (e.g., 1.0 for normal conditions), traffic conditions, transport time, weather conditions, coinciding events (e.g., a concert or sporting event ending proximate to the transport route), and the like. Thus, the pricing engine 165 can utilize the pricing data logs 162 in the database 160 in order to, for example, implement machine learning techniques and/or filter the pricing data logs 162 in order to accurately predict an upfront price 167 of requested transport services prior to the requesting user accepting the transport service.

In some examples, the selection engine 135 can provide information 149 corresponding to the scheduled transport 142 to the pricing engine 165 prior to the scheduled transport time. In certain aspects, the information 149 can further comprise traffic data 177 or predicted traffic information for a route to be traveled by the selected transport provider 189 after making the scheduled pick-up. Additionally or alternatively, the information 149 can include third-party data 157 provided by third-party resources 155, such as event data, road construction information, predicted weather information for the scheduled transport 142. In many examples, this information 149 can be provided to the pricing engine 165 prior to the requesting user scheduling the transport request 198 in order to generate an upfront price 167 based on such information 149 as well as the pricing data logs 162.

As an example, when the requesting user utilizes the scheduled transport feature on the designated application 195, and inputs a start time, a start location, a destination, and, in some examples, a transport service type, the pricing engine 165 can filter the pricing data logs 162 based on the inputted information and perform a lookup for actual transport requests 197 serviced with the same or similar characteristics. Additionally, the pricing engine 165 may be provided with additional information 149 such as predicted weather conditions, event calendar information, road construction information, and the like, in order to further filter the pricing data logs 162 to identify a number of matching transport requests 197—and hence their charged costs—in order to determine an upfront price 167 for the scheduled transport 142. In early implementations, the upfront price 167 may be offered only when the pricing engine 165 calculates a certainty probability of the upfront price 167 above a certain threshold (e.g., 95%) in relation to a traditional fare meter price for the scheduled transport 142 based on distance, time, and/or ride service type. However, in further implementations, as collected historical pricing data 117 and the pricing data logs 162 become more robust, the pricing engine 165 can accurately predict upfront prices 167 for every on-demand transport request 197 and scheduled transport 142.

According to examples described herein, the designated application 195 can automatically submit a query via to the pricing engine 165 when a transport service type, a start location, a start time, and a destination are inputted. The pricing engine 165 can return an upfront price 167 based on the above factors, which can comprise a guaranteed offer to the requesting user for the on-demand transport or scheduled transport 142. For scheduled transport 142 implementations, the pricing engine 165 can predicted the upfront price 167 based on future conditions (e.g., event conditions, traffic conditions, weather conditions, etc.), which can be extrapolated from both the pricing data logs 162 and the third-party resources 155. The pricing engine 165 may then submit the upfront price 167 to the user device 190 prior to the user scheduling the transport request 142. In these examples, when the requesting user submits the scheduled transport request 198 to the scheduling engine 140, the schedule transport request 198 may already include an acceptance of the upfront price 167, which can bind the network system 100 to the upfront price 167 for the scheduled transport 142 despite future contingencies during the actual scheduled transport.

Additionally, the information 149 for the pricing engine 165 can further comprise the dynamic provider location 181 of the selected transport provider 189 and the scheduled start time and location of the scheduled transport 142. Examples described herein recognize that in order to facilitate efficiency and optimize timing and cost both the requesting user and the transport provider for the scheduled transport 142, these entities may be held to at least minimal scheduling duties in order to disincentivize unnecessary delays that, on the one hand, could make the requesting user late for a flight or an important meeting, and on the other hand, could waste valuable time for the transport provider in servicing additional transport requests 197 throughout the day. Thus, the pricing engine 165 can execute optimized pricing calculations that discourage cancelations as well as belatedness.

In one example, the pricing engine 165 can implement a "pay to wait" calculation. In this example, the pricing engine 165 can monitor the provider location 181 of the selected transport provider 189 as the provider 189 is traveling to the start location. If the selected transport provider 189 arrives at the start location early, then no additional charges may be incurred. However, if the transport provider 189 arrives on time, and the requesting user is late, the pricing engine 165 can initiate a logical fare meter once the scheduled start time has lapsed based on a transport service rate 164 corresponding to the requested transport service type. In upfront price 167 implementations, the incurred charge for the wait time (i.e., between the schedule start time when the selected transport provider 189 has arrived and the time in which the requesting user enters the vehicle) can be tagged onto the upfront price 167 at the end of the ride. In such examples, a notification can be provided to the requesting user beforehand (e.g., when accepting the upfront price 167 and scheduling the transport 142).

Furthermore, in certain implementations the requesting user can cancel the scheduled transport 142 at any time up until a predetermined time prior to the scheduled start time. This predetermined time may be a set time (e.g., thirty minutes), or may be triggered based on a transport provider 189 being selected to service the scheduled transport 142. In the latter example, acceptance to service the scheduled transport 142 can comprise an expectation on the transport provider's 189 part in which some compensation is warranted. Thus, the requesting user may be notified that once the transport provider 189 has accepted or claimed a transport invitation 182 or claim offer 186 corresponding to the scheduled transport 142, charges may incur for cancellation. In one example, the pricing engine 165 can initiate a standard fare meter for the transport service type once the driver accepts the transport invitation 182. If the requesting user cancels the scheduled transport 142, the pricing engine 165 can incur a charge to the requesting user based on the standard rate between transport provider acceptance 183 and the cancelation time. In variations, the pricing engine 165 can calculate the cancelation fee at a separate cancelation rate, or can charge a flat fee.

The pricing engine 165 can also charge the transport provider for canceling an accepted scheduled transport 142. Given the nature of transport scheduling and the inherent importance of fulfilling expected scheduled transports 142, driver cancelation after acceptance may be heavily discouraged. Furthermore, it is envisioned that the network system 100 will compensate the requesting user in the unlikely event of failure to fulfill a scheduled transport 142. Such compensation may be in the form of a fully credited future ride, which can create the potential for fraud by conspiring drivers and users. In order to prevent such fraud, the network system 100 can provide a discounted future ride, notify and charge the driver for canceling the accepted ride, and/or revoke the driver's credentials for utilizing the platform to service transport requests in the future.

According to certain implementations, a trigger 144 for an upcoming scheduled ride 142 can cause the selection engine 135 to perform a search for available transport providers. In certain scenarios, the selection engine 135 may realize that available driver supply is lacking significantly in the area surrounding the scheduled start location. In other scenarios, the scheduling engine 140 can identify the start location as being in a remote area, and thus notify the selection engine 135 to "move supply" in order to ensure adequate transport provider supply for the scheduled transport 142. In either scenario, the selection engine 135 can generate and transmit one or more incentive offers 184 to vehicles 185 within a certain area of the start location. The incentive offers 184 can include, for example, a bonus payment, an early fare meter initiation (e.g., in which the pricing engine 165 initiates the fare meter for the transport provider 189 from a current location to the start location), a higher service rate, and the like. In certain examples, the selection engine 135 can issue the incentive offer 184 to multiple transport providers at the same time, and award the incentive offer 184 to a first accepting driver, which can bind or associate the accepting driver to the scheduled transport 142. In variations, the selection engine 135 can transmit the incentive offer 184 to one provider device 188 at a time, which the transport provider can accept, decline, or ignore (e.g., automatically after fifteen seconds).

In certain examples, the network system 100 can synch the scheduled transport 142 with other applications on the user device 190, such as a calendar application. In variations, the network system 100 can provide the transport scheduling feature on third-party applications or websites to enable the user to schedule transport 142 in conjunction with scheduling a flight or a meeting. In scheduling transport through a calendar application on the user device 190 or via a third-party application or website, the network system 100 can provide a "zero-click" function in which the scheduled transport 142 is automatically arranged and shows up at the start location (e.g., inputted or preset as a default, such as the user's home screen) without any additional input by the requesting user.

As provided herein, the network system 100 can implement a number of backup measures to ensure fulfillment of each scheduled transport 142. Such backup measures can include features described herein such as moving supply and failing over to alternative ride service types. Furthermore, rapid data collection can enable the pricing engine 165 to accurately predict upfront prices 167 for not only on-demand rides based on current information (e.g., weather, traffic, supply, demand, etc.), but also for future scheduled transport requests 198 to provide users with added certainty in utilizing the transport arrangement services managed by the network system 100.

Figure 2:
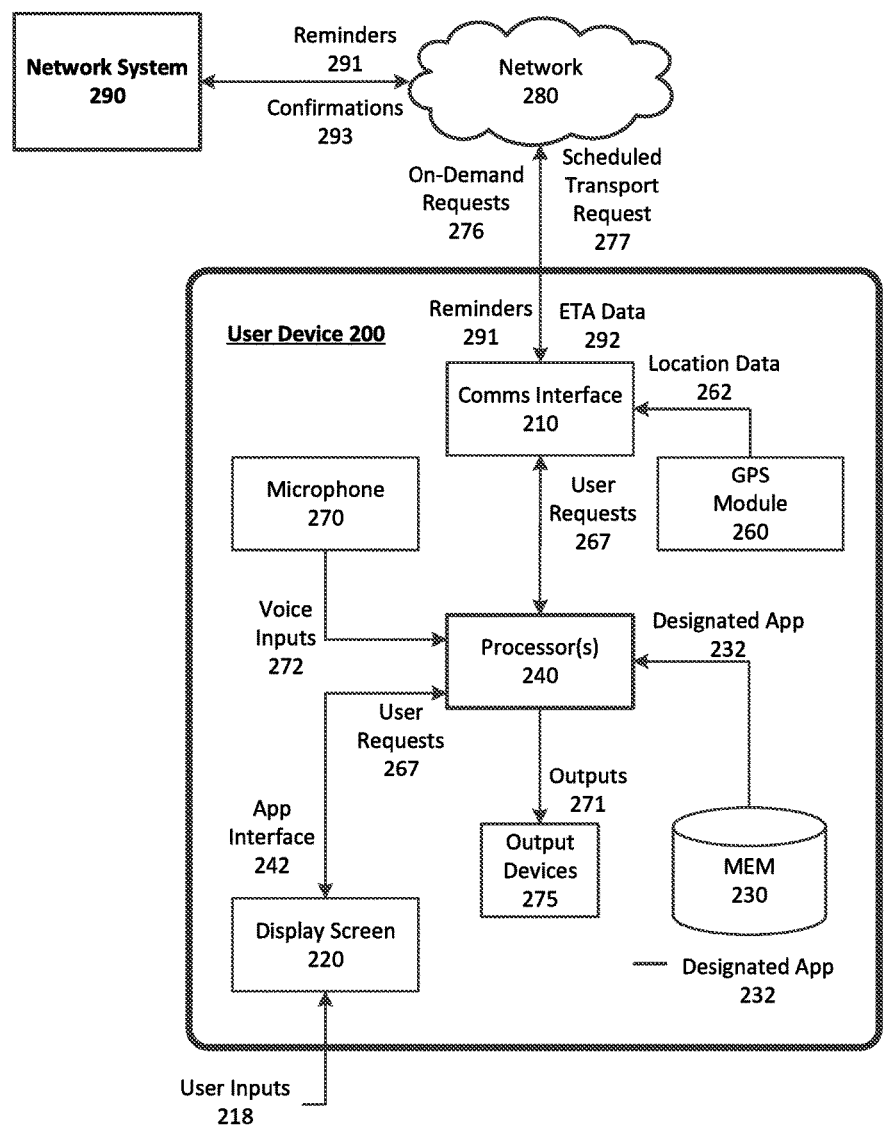
FIG. 2 is a block diagram illustrating a user device executing a designated application for a transport arrangement service, as described herein.

FIG. 2 is a block diagram illustrating a user device executing a designated application for a transport arrangement service, as described herein. The mobile computing device 200 can store a designated application (e.g., a designated transport app 232) in a local memory 230. In response to a user input 218, the designated app 232 can be executed by a processor 240, which can cause an app interface 242 to be generated on a display screen 220 of the mobile computing device 230. The app interface 242 can enable the user to, for example, check current price levels and availability for the transportation arrangement service. In various implementations, the app interface 242 can further enable the user to select from multiple ride services, such as a carpooling service, a regular rider service, a professional ride service, a van transport service, a luxurious ride service, and the like.

The user can generate a user request 267 via user inputs 218 provided on the app interface 242. For example, the user can select a start location, view the various service types and estimated pricing, and select a particular service for transportation to an inputted destination. As provided herein, the user requests 267 can comprise an on-demand transport request 276 for immediate or near-immediate pick-up, or can comprise a scheduled transport request 277 described herein. In certain implementations, current location data 262 from a GPS module 260 of the mobile computing device 200 can be transmitted to the network system 290 (e.g., the network system 100 of FIG. 1) to set the start location. In many examples, the user can also input the destination prior to start. The processor 240 can transmit the start request 267 via a communications interface 210 to the backend network system 290 over a network 280. In response, the mobile computing device 200 can receive a confirmation 269 from the network system 290 indicating the selected SDV that will service the start request 267 and rendezvous with the user at the start location.

In certain implementations, the mobile computing device 200 can further include a microphone 270 to enable the user to provide voice inputs 272 to further interact with the designated application 232. For example, instead of providing user inputs 218 on the display screen 220, certain commands can be provided via voice input 272 (e.g., user requests 267, confirmations, cancelations, postponements, etc.). Additionally, the mobile computing device 200 can include one or more output devices 275 that can provide outputs 271 and/or feedback based on user interactions and responses through the rider application 232. Such outputs 271 can include haptic and/or audio feedback (e.g., voice feedback) generated by the designated application 232, such as ride update information, tonal responses, alerts, and the like.

According to examples, the mobile computing device 200 can receive ETA data 292 from the network system 290. Current ETA information for mapping, routing, and traffic resources may utilize GPS information (e.g., location data 262 from the GPS resources of users' mobile devices). Examples described herein can significantly improve the ETA data 292 utilizing real-time location data from transport providers, which can further be utilized by the network system 290 in mid-level routing of the transport providers, as described herein. This can further bolster ETA predictability and provide users of the service with highly accurate ETA information relating to arrival times for pick-up and overall trip time to a destination.

In one example, the ETA data 292 can include estimated arrival times for a plurality of transport providers that are proximate to the user's current location. For example, the app interface 242 can include a mapping feature with real-time virtual representations of transport providers traveling on the mapping feature. The ETA data 292 can include an estimated arrival time for each of the transport providers on the map (e.g., on a miniature window next to the SDV's displayed virtual representation). Additionally or alternatively, the ETA data 292 can include an estimated arrival time of a transport provider selected to service an on-demand request 276 submitted by the user. In further examples, the ETA data 292 can include an estimated arrival time to a destination once the user has been start by the selected transport provider.

In accordance with many aspects, upon submitting a scheduled transport request 277, the user device 200 can be provided with confirmations 293 that the transport request 277 has been scheduled and that the transport provider is traveling to once a driver has accepted or an SDV has been instructed to rendezvous with the requesting user. Furthermore, after a scheduled transport request 277 has been submitted, the user device 200 can periodically receive reminders 291 of the upcoming ride.

Figure 3:
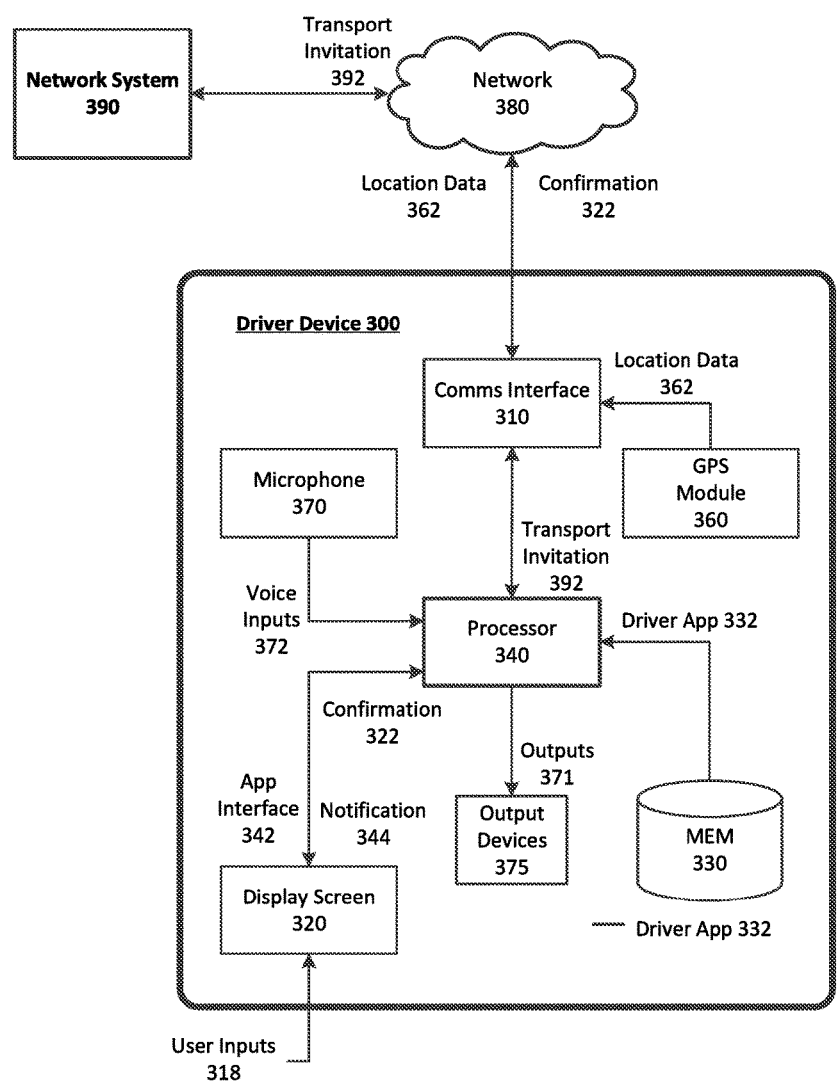
FIG. 3 is a block diagram illustrating a driver device executing a designated driver application for a transport arrangement service, as described herein.

FIG. 3 is a block diagram illustrating a driver device executing a designated driver application for a transport arrangement service, as described herein. The driver device 300 can store a designated driver application 332 in memory 330, which the driver can execute via user inputs 318 to notify the network system 390 (e.g., the transport coordination system 100 of FIG. 1) that the driver is available to service start requests and scheduled ride requests. In many examples, the user device 200 of FIG. 2 and the driver device 300 of FIG. 3 can comprise mobile computing device (e.g., smart phone devices) that can execute any number of applications stored thereon. Upon initiating the driver application 332, the driver device 300 can initiate a GPS module 360 to transmit location data 362 to the network system 390 over a network 380. Based on the location data 362, the network system 390 can transmit transport invitations 392 to the driver device 300 for transport requests at proximate locations in relation to the driver's current location.

The transport invitations 392 may be invitations for on-demand rides, or invitations to service a scheduled transport request. The transport invitations 392 can be received by a communications interface 310 of the driver device 300 and processed by a processor 340. In executing the driver application 332, the processor 340 can generate a driver application interface 342 on a display screen of the driver device 300 to enable the driver to accept or decline the transport invitation 392, or to cancel a currently accepted invitation 392. In some implementations, since the driver may be driving, the driver device 300 can include a microphone 370 to enable the driver to input voice inputs 372 in order to accept or decline transport invitations 392. The driver device 300 may further include one or more output devices 375, which can provide haptic or audio responses, feedback, or notification outputs 371 to the driver in conjunction with notification(s) 344 being displayed on the display screen 320. In accepting an on-demand or scheduled transport request, the driver can input a confirmation 322 to service the transport request and rendezvous with the requesting user at a start location specified in the transport invitation 392.

User Interface Examples

Figure 4A:
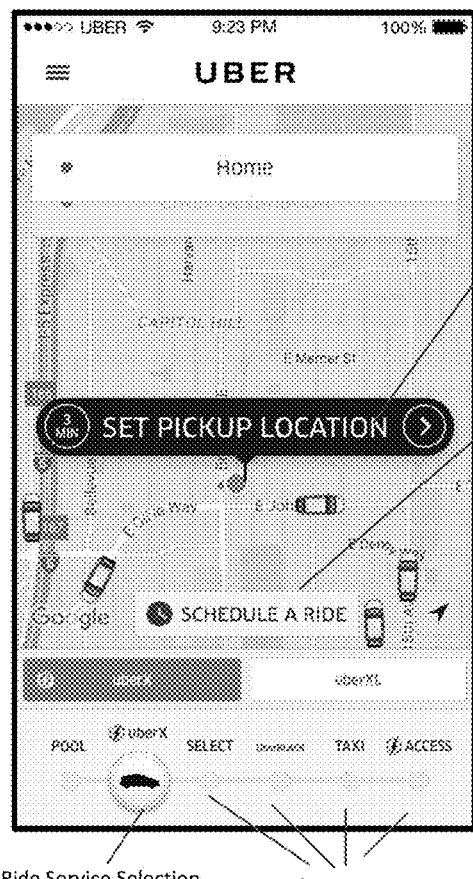
FIGS. 4A through 4E are example screenshots illustrating the scheduled rides feature on a user device executing a designated application, according to examples described herein.

FIGS. 4A through 4E are example screenshots illustrating the scheduled rides feature on a user device executing a designated application, according to examples described herein. FIG. 4A shows an example home screen for the rider application. The home screen can enable the user to set a pick-up location using a pick-up location pin 402 in order to request an on-demand ride, or to schedule a future ride by selecting the scheduled ride feature 410. In various examples, the home screen can include a mapping feature and a selection portion that enables the user to scroll through multiple different ride service types 404 using a ride service selection feature 406. According to some examples, the locations of available vehicles can be represented by small virtual objects (as shown), and can be filtered based on the ride service selection. Thus, as the user scrolls the ride service selection feature 406 across multiple ride service types 404, the rider application can automatically update the displayed interface to include only those vehicles that match the ride service type 404 on which the ride service selection feature 406 is located.

Figure 4B:
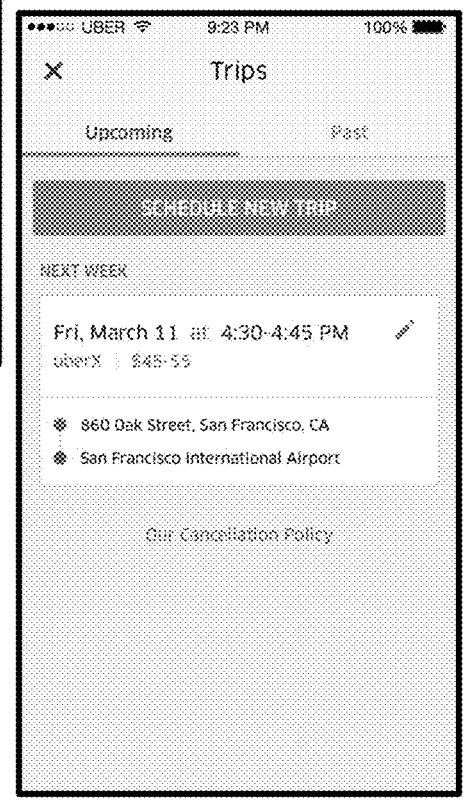

FIG. 4B shows an example screen shot of a confirmation screen 412 in which the user has inputted a time, date, and destination for the scheduled ride based on the pick-up location of the previous screen shown in FIG. 4A. As shown in FIG. 4B, the user can be enabled to edit the scheduled ride, or schedule another ride.

Figure 4C:
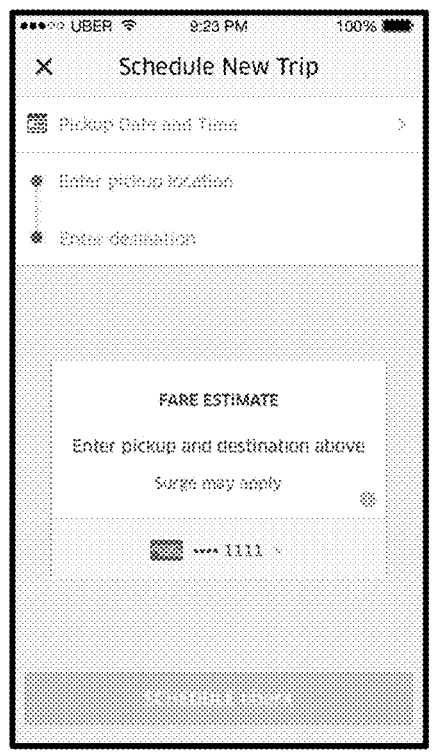
Figure 4D:
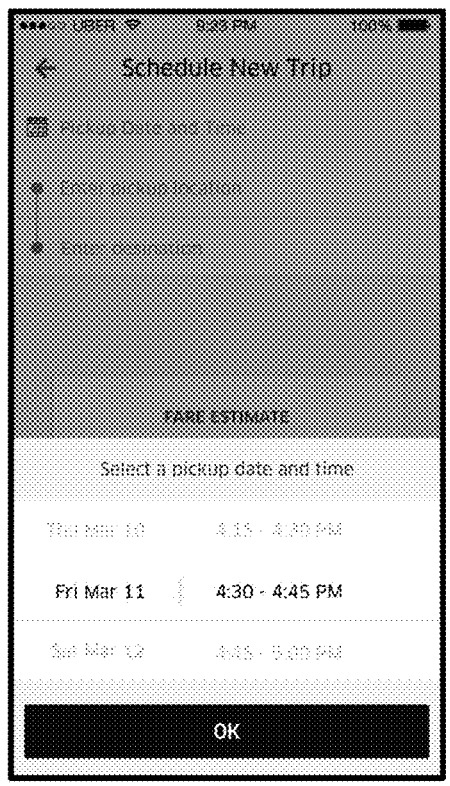
Figure 4E:
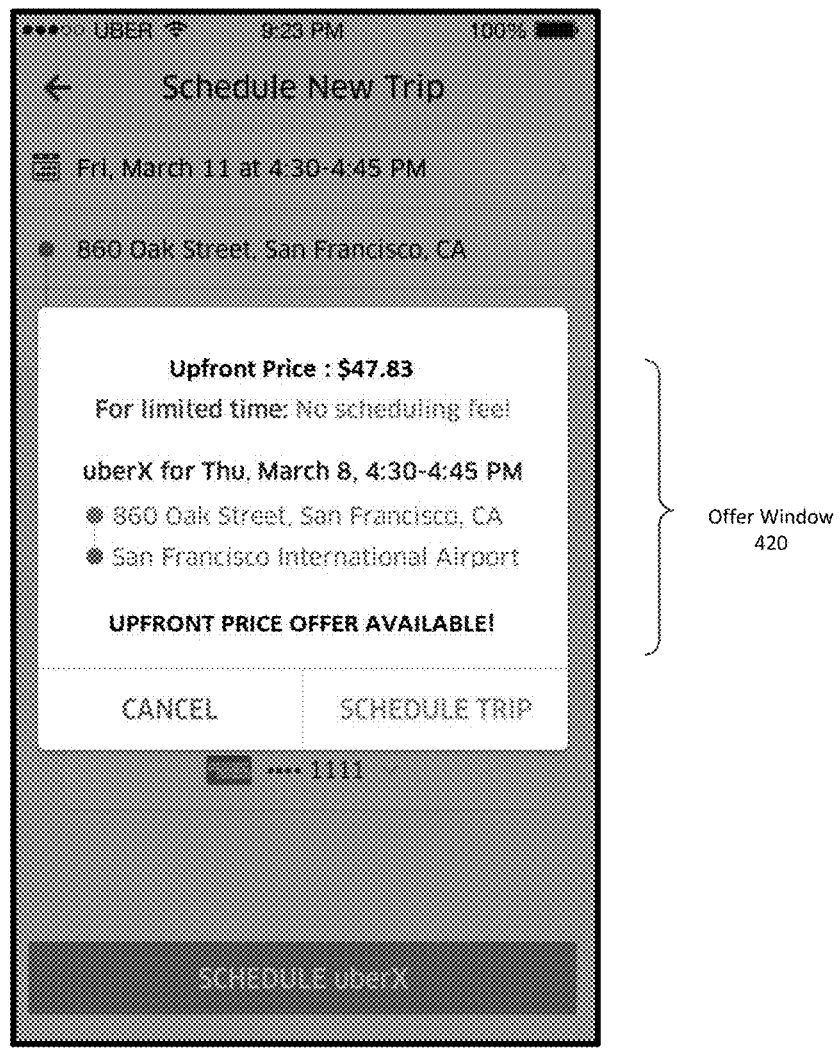

In certain implementations, as shown in FIG. 4C, selection of the scheduled ride feature 410 can cause a scheduled ride input screen 414 to be generated that enables the user to input the various details of the scheduled ride, such as a pick-up data and time, a pick-up location, and a destination. As shown in FIG. 4D, selection of the various input features of the scheduled ride input screen 414 can cause a corresponding input window 416 to be generated, which enables the user to quickly set an inputted value, such as a date and time. In certain implementations described herein, upon entering the information for the scheduled ride, the network system 100 of FIG. 1 can determine that sufficient pricing data has been compiled to provide an upfront price for the scheduled ride, which may be scheduled by the user well prior to the pick-up time (e.g., two weeks or a month prior). Thus, as shown in FIG. 4E, an offer window 420 can be generated including a calculated upfront price (as shown) for the scheduled ride. The user can be enabled to cancel, decline, or accept the upfront price on the offer window 420. Furthermore, upon accepting the upfront price, the scheduled ride request can be transmitted to the network system 100 and the ride can be scheduled accordingly.

Methodology

Figure 5:
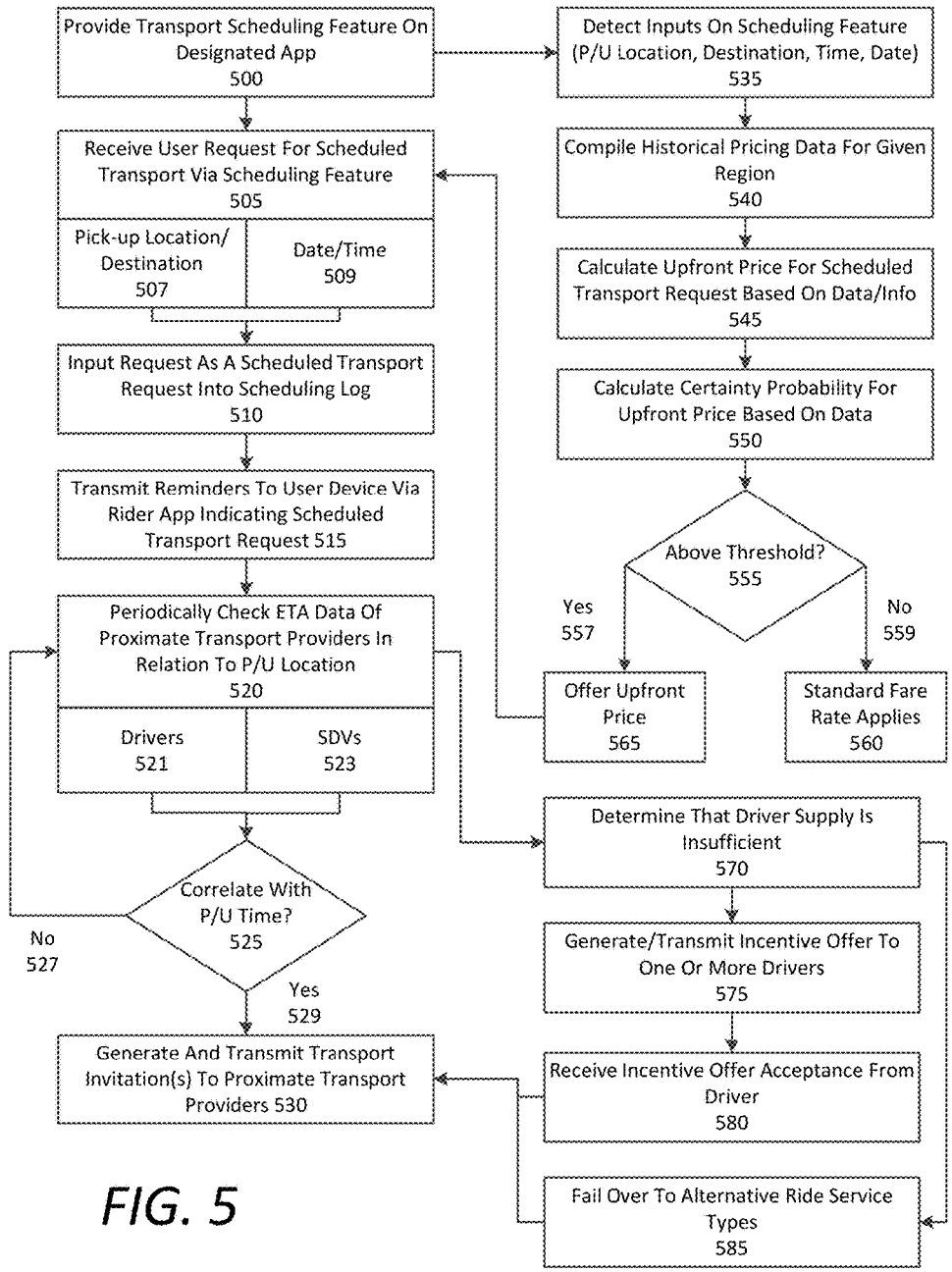
FIG. 5 is a flow chart describing an example method of implementing a scheduled transport service, according to examples described herein.

FIG. 5 is a flow chart describing an example method of implementing a scheduled transport service, according to examples described herein. In the below description of FIG. 5, reference may be made to reference characters representing like features shown and described with respect to FIG. 1. Furthermore, the various processes discussed below in connection with FIG. 5 may be performed by an example network system 100 as described with respect to FIG. 1. Referring to FIG. 5, the network system 100 can provide a transport scheduling feature on the designated application 195, which can enable users to schedule transport in connection with an on-demand transportation arrangement service managed by the network system 100 (500).

In various implementations, the network system 100 can detect inputs on via scheduling feature, which can include a start location, a destination, a date, and a start time (535). In some examples, the network system 100 can further compile historical pricing data for a given region, as described herein (540). Based at least in part on the historical pricing data and the inputted scheduled ride information, the network system 100 can calculate an upfront price 167 for the scheduled transport request 198 (545). In variations, the upfront price 167 can further be based on third-party data 157, such as event information, weather conditions, time of day and day of the week (e.g., rush hour on a weekday), and the like.

The network system 100 can then calculate a certainty probability for the upfront price 167 based on the foregoing data (550). For example, the certainty probability can comprise a probability that the calculated upfront price 167 will be within a predetermine range (e.g., 3-5%) of an actual price of fulfilling the scheduled transport request 198 utilizing a logical fare meter and a fare rate base on the transport service type. Thus, the network system 100 can determine whether the certainty probability is above a certain threshold (e.g., 95%) (555). If not, (559), then the network system 100 can apply a standard fare rate for the scheduled transport request 198 at the time the transport request 198 is serviced (560). However, if so (557), then the network system 100 can offer the upfront price 167 as a guaranteed price for the scheduled transport request 198 (565).

In many examples, the network system 100 can receive user requests 196 for future, scheduled transport via the scheduling feature on the designated application 195 (505). The scheduled transport request 198 can include a start location and destination (507), and a scheduled date and scheduled start time (509). The network system 100 can input each user request 196 as a scheduled ride 142 in the scheduling logs 132 managed in memory 130 of the system 100 (510). In certain aspects, the network system 100 can transmit periodic reminders to the user devices 190 corresponding to the scheduled transport requests 198, either by push notification or via the designated application 195 (e.g., if executing on the device 190) (515).

As each scheduled transport request 198 approaches, the network system 100 can periodically check ETA data of proximate transport providers in relation to the start location to gauge transport supply (520). The ETA data can comprise estimated arrival time information of proximate available drivers (521) and/or SDVs (523) of the specified transport service type indicated in the scheduled transport request 198. Accordingly, the network system 100 may determine whether the ETA data of the drivers and/or SDVs correlate with the time delta to the start time (525). If not (527) (e.g., if there is a surplus of transport supply within a time-based or location-based geo-fence around the start location), then the network system 100 can place the scheduled transport request 198 on standby and check again in the near future (e.g., every two minutes) (520). However, if so (529) (e.g., if the ETA time for one or more transport providers is within a certain range of the time delta to the start time), then the network system 100 can generate and transmit one or more transport invitations 182 to the one or more proximate drivers or SDVs (530), which can accept or decline the transport invitations 182 accordingly. As provided herein, a first accepting transport provider (whether driver or SDV) can comprise an optimal transport providers to service the scheduled transport request 198.

In some examples, in checking the transport supply for the scheduled transport request 198, the network system 100 can determine that driver and/or SDV supply is insufficient (570). For example, the system 100 can identify a certain risk factor that no transport providers will be available within a certain proximate of the start location. In such scenarios, the network system 100 can fall back on a number of options or combination of options. In one example, the network system 100 can generate and transmit an incentive offer 184 to one or more transport providers close to the start location (575), to which the transport providers may accept or decline (575). As provided herein, the incentive offer 184 can comprise a bonus payment or other incentive (e.g., initiating the fare meter early) to incentivize an available transport provider to at least travel towards the start location. Thus, the network system 100 can receive an incentive offer acceptance from a particular driver (580), and thereafter transmit a transport invitation 182 to that transport provider to rendezvous with the requesting user to service the scheduled transport request 198 (530).

Additionally or alternatively, in situations of insufficient supply for the requested transport service type, the network system 100 can fail over to alternative transport service types (585). In other words, if the network system 100 determines that supply for the requested transport service type (e.g., a professional transport service) is lacking significantly, in order to ensure fulfilling the scheduled transport obligation, the network system 100 can begin to transmit transport invitations or directives 182 to drivers and vehicles of alternative service types (e.g., peer-to-peer or ride pool service types) (530). Thus, once a transport directive or invitation 182 is accepted, then the network system 100 can monitor the rendezvous and trip to ensure success accordingly. In certain examples, if the driver arrives at the start location and the requesting user has not rendezvoused with the driver by the start time, the network system 100 can initiate a fare meter for the scheduled ride regardless of whether the user has or has not rendezvoused with the accepting driver. If any issues arise, such as cancelations, then the network system 100 can implement backup procedures and attribute charges, as described herein.

Figure 6:
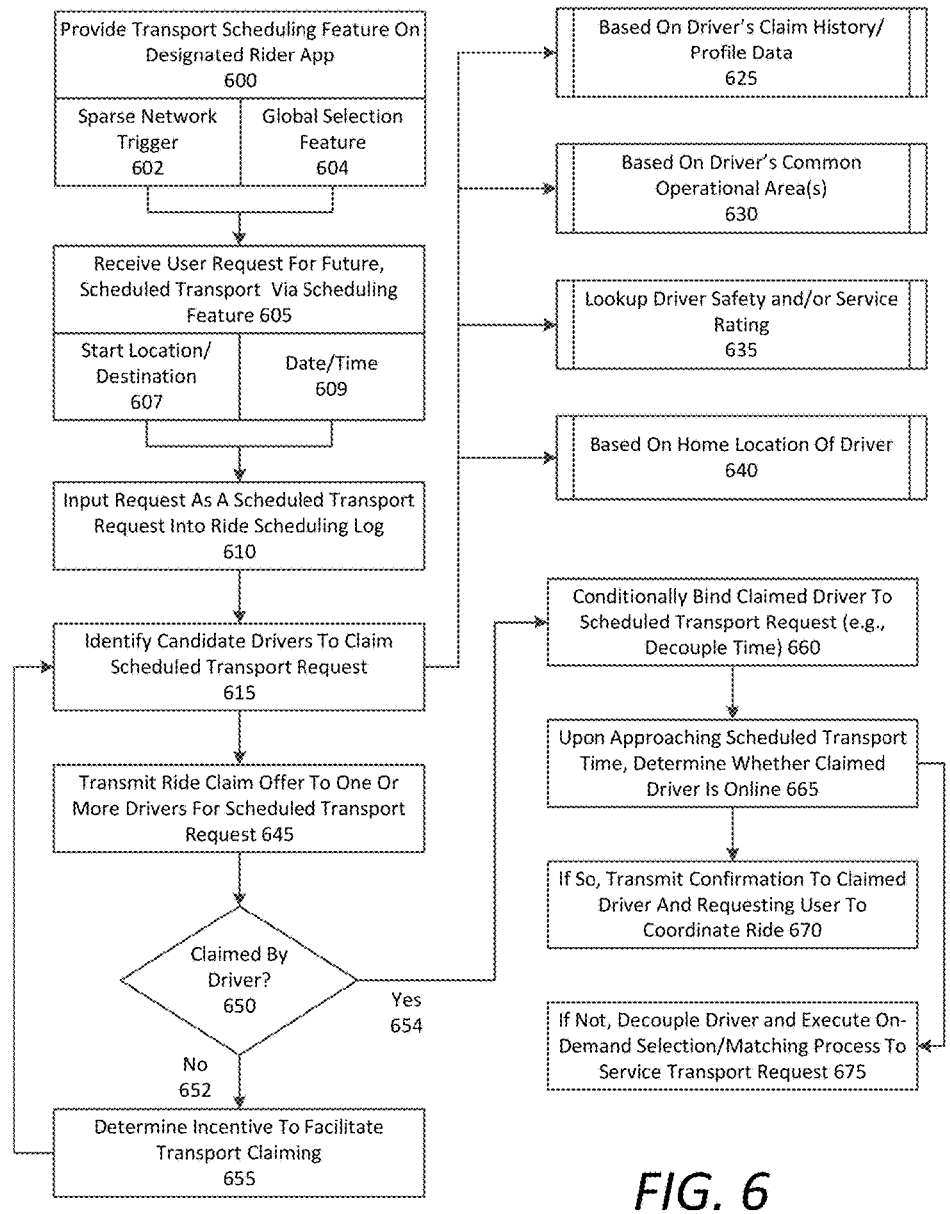
FIG. 6 is a flow chart describing example methods of coordinating scheduled transport, according to examples described herein.

FIG. 6 is a flow chart describing example methods of coordinating scheduled transport, according to examples described herein. In the below discussion of FIG. 6, reference may be made to references characters representing like features as described above with respect to FIGS. 1 through 4E. Furthermore, one or more steps described in connection with FIG. 6 may be performed in conjunction with or in addition to one or more steps discussed above with respect to FIG. 5. Referring to FIG. 6, the network system 100 can provide a ride scheduling feature on the designated app 195 of a requesting user's computing device 190 (600). In some aspects, the ride scheduling feature can be provided based on a sparse network trigger (602). For example, if the user's home location or start location is outside a typical service area for on-demand transportation services, then the designated application 195 can include ride scheduling feature specifically to enable drivers to claim rides. In other examples, the ride scheduling feature can be a global feature for the designated application 195 that users can utilize (604).

The network system 100 can receive user requests for future, scheduled transport via the scheduling feature (605). In various aspects, each scheduled transport request 198 can comprise a start location and destination (607) as well as a date and a time for the scheduled transport request 198 (609). As described herein, the network system 100 may then input the request as a scheduled transport request 198 into a ride scheduling log 132 (610). The network system 100 may then identify a candidate set of transport providers to claim the scheduled transport request 198 (615).

According to various implementations, the network system 100 determine the candidate drivers based on the driver's claimed rides history in the driver's profile data (625). For example, if the driver is otherwise an ideal candidate, but has a propensity towards forsaking claimed rides, the network system 100 can exclude the driver from the candidate set. The network system can also determine the candidate set based on the driver's common operational area(s) (630). The network system 100 can also perform lookups in the driver's safety and/or service ratings (635). For example, certain schedules transport requests may be relatively lucrative for drivers, and the network system 100 can incentivize good ratings and good service in general by providing those drivers with claim offers 186 for the most lucrative scheduled transport requests 198. In still further implementations, the network system 100 can determine the candidate set based on the home locations of the drivers (640). For example, the network system 100 can correlate the start location of the scheduled transport request 198 to the home locations of drivers within a certain proximity of the start location. The network system 100 may then provide the claim offer 186 for the scheduled transport request 198 to a driver with a nearest or close to nearest home location to the start location.

In various examples, the network system 100 can then transmit the claim offer 186 to one or more most optimal drivers for the scheduled transport request (645). The network system 100 may then determine whether the scheduled transport request 198 has been claimed by the driver (650). For example, the network system 100 can give the driver a certain amount of time to accept the claim offer 186. If the driver does not accept the claim offer 186 within the allowable timeframe (652), then the network system 100 can either determine an incentive to attached to the claim offer 186 to further facilitate transport claiming (655), and/or identify a next best driver or a new candidate set of drivers, as described above (615).

If the driver accepts the claim offer 186 (654), then the network system can conditionally bind or associate the claimed driver or accepting driver to the scheduled ride (660). The conditions for the binding or associating can comprise factors such as the claimed driver must be online or on-duty and available at a specified decouple time prior to the start time for the scheduled transport request 198. Additionally, the conditions can include that the driver must be within a certain distance from the start location at the specified decouple time. As provided herein, the decouple time may be determined dynamically based on a current driver network density surrounding the start location (e.g., a number of available driver within a two or three kilometer radius of the start location).

Upon approaching the scheduled transport time, the network system 100 can determine whether the claimed driver is online and available (665). If so, the network system 100 can transmit a confirmation request to the claimed driver to ensure that the scheduled transport request 198 will be serviced, and a confirmation 199 to the requesting user to coordinate the ride (670). However, if the claimed driver is not online and/or is unavailable at the specified decouple time, the network system 100 can decouple or otherwise disassociate the driver from the scheduled transport request 198 and execute a normal, default on-demand selection and matching process to service the scheduled transport request 198 as a more typical on-demand ride, as described herein (675).

Hardware Diagram

Figure 7:
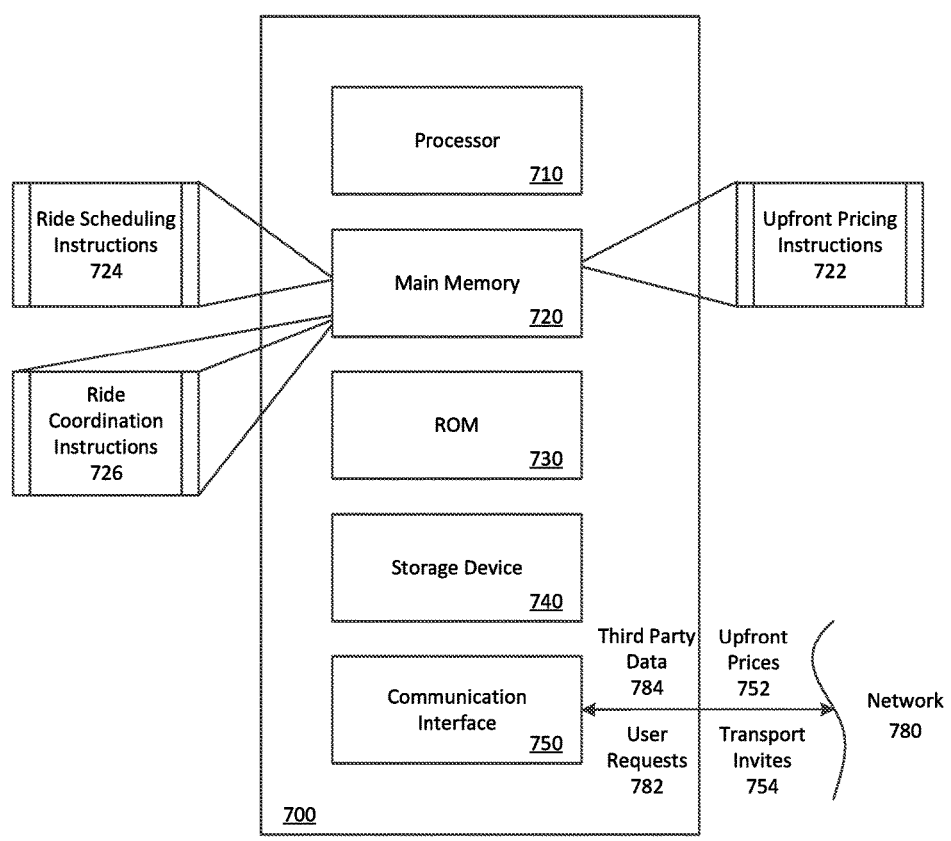
FIG. 7 is a block diagram illustrating a computer system upon which examples described herein may be implemented.

FIG. 7 is a block diagram that illustrates a computer system upon which examples described herein may be implemented. A computer system 700 can be implemented on, for example, a server or combination of servers. For example, the computer system 700 may be implemented as part of a network service for providing transportation services. In the context of FIG. 1, the network system 100 may be implemented using a computer system 700 such as described by FIG. 7. The network system 100 may also be implemented using a combination of multiple computer systems as described in connection with FIG. 7.

In one implementation, the computer system 700 includes processing resources 710, a main memory 720, a read-only memory (ROM) 730, a storage device 740, and a communication interface 750. The computer system 700 includes at least one processor 710 for processing information stored in the main memory 720, such as provided by a random access memory (RAM) or other dynamic storage device, for storing information and instructions which are executable by the processor 710. The main memory 720 also may be used for storing temporary variables or other intermediate information during execution of instructions to be executed by the processor 710. The computer system 700 may also include the ROM 730 or other static storage device for storing static information and instructions for the processor 710. A storage device 740, such as a magnetic disk or optical disk, is provided for storing information and instructions.

The communication interface 750 enables the computer system 700 to communicate with one or more networks 780 (e.g., cellular network) through use of the network link (wireless or wired). Using the network link, the computer system 700 can communicate with one or more computing devices, one or more servers, driver devices, and/or SDVs. In accordance with examples, the computer system 700 receives user requests 782 (e.g., on-demand requests or scheduled transport requests) from mobile computing devices of individual users. The executable instructions stored in the memory 730 can include ride scheduling instructions 724, which the processor 710 can execute to schedule the ride, provide reminders, generate and transmit transport invitations or directive 754 to drivers and/or SDVs, and implement one or more backup options when transport supply is insufficient (e.g., fail over to a different ride type or generate incentive offers) in order to ensure fulfillment of the scheduled ride.

The main memory 720 can also store upfront pricing instructions 722, which the processor 710 executes to compile and chronicle or otherwise classify pricing data for serviced rides throughout the given region. In executing the upfront pricing instructions 722, the processor can further utilize third party data 784, such as event data (e.g., sporting events, concerts), weather information (e.g., rainy weather can indicate an increase in transport demand), traffic information, and the like. The pricing instructions 722 can cause the processor 710 to utilize the foregoing data as well as route information for a scheduled ride, time of day, day of week, and other calendar information, to determine an upfront price 752 for the scheduled ride, as described herein.

The main memory 720 can also store ride coordination instructions 726, which the processor 710 can execute to identify candidate drivers to claim a scheduled ride. In doing so, the computer system 700 can perform lookups in driver profiles 166 and optimize between driver history, common operational areas, home locations, and safety ratings of the drivers to converge on, or otherwise determine an optimal driver to which the scheduled ride can be offered and claimed. Execution of the ride coordination instructions 726 can further cause the computer system 700 monitor the claimant transport provider upon approaching the scheduled ride time, provide notifications to the driver, and ultimately determine whether the driver will fulfill the claimed ride. If so, then the computer system 700 can provide the driver with a transport invitation 754 to facilitate the start. However, if the driver forsakes the claimed ride (e.g., is not on-duty at a predetermined time prior to the scheduled time), then the computer system 700 can execute a default or standard on-demand selection and matching process to fulfill the scheduled ride as an on-demand ride request.

The processor 710 is configured with software and/or other logic to perform one or more processes, steps and other functions described with implementations, such as described by FIGS. 1 through 6, and elsewhere in the present application.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A network computer system implementing a transport service, comprising:
   a network communication interface communicating, over one or more networks, with (i) computing devices of users of multiple users of the transport service, and (ii) computing devices of a plurality of transport providers of the transport service;
   one or more processors; and
   one or more memory resources storing (i) profile information of each transport provider of the plurality of transport providers, the profile information including a preselected location of each transport provider, and (ii) instructions that, when executed by the one or more processors, cause the network computer system to:
      transmit, over the one or more networks, display data to the computing device of a respective user of the multiple users, the display data causing a designated application executing on the computing device of the respective user to generate a plurality of selection features on a user interface, each of the plurality of selection features corresponding to one of a plurality of transport service options of the transport service;
      receive, over the one or more networks, a scheduled transport request from the computing device of the respective user, the scheduled transport request indicating (i) a pick-up location, (ii) a destination location, (iii) a scheduled date and a scheduled time to transport the respective user from the pick-up location to the destination location, and (iv) a selected transport service option from the plurality of transport service options; and
      implement a hierarchical selection process to fulfill the scheduled transport request, wherein implementing the hierarchical selection process includes implementing a first selection process and a second selection process, the first selection process comprising:
         determining a set of candidate transport providers of the plurality of transport providers to transport the respective user from the pick-up location to the destination location at the scheduled date and the scheduled time based, at least in part, on the preselected location of each candidate transport provider of the set of candidate transport providers;
         transmitting a notification, over the one or more networks, to the computing device of each candidate transport provider;
         receiving a confirmation message, over the one or more networks, from the computing device of an accepting transport provider of the set of candidate transport providers;
         in response to receiving the confirmation message, associating the accepting transport provider with the scheduled transport request in a record database;
         receiving, over the one or more networks, state data from the computing device of the accepting transport provider, the state data indicating that the accepting transport provider is unable to fulfill the scheduled transport request at the scheduled time; and
         upon determining that the accepting transport provider is unable to fulfill the scheduled transport request at the scheduled time, disassociating the accepting transport provider with the scheduled transport request in the record database;
      at a specified time prior to the scheduled time, automatically implement the second selection process based on disassociating the accepting transport provider with the scheduled transport request, the second selection process comprising:
         receiving, over the one or more networks, location data indicating current locations of a set of proximate transport providers, of the plurality of transport providers, that are proximate to the pick-up location, the location data being received from a location-based resource of the computing device of each of the set of proximate transport providers;
         determining an estimated time of arrival (ETA) to the pick-up location for each of the set of proximate transport providers based at least on the location data;
         selecting a backup transport provider from the set of proximate transport providers based, at least in part, on the ETA of each of the set of proximate transport providers, and the scheduled time; and
         transmitting a transport invitation, over the one or more networks, to the computing device of the backup transport provider to enable the backup transport provider to fulfill the scheduled transport request at the scheduled time.

2. The network computer system of claim 1, wherein the executed instructions further cause the one or more processors to:
   compile historical pricing data for individual transport services executed throughout a given region;
   in response to receiving the scheduled transport request, utilize the historical pricing data to determine an upfront price for the scheduled transport request, the upfront price being based at least in part on the scheduled date, the scheduled time, the pick-up location, and the destination location; and input the scheduled transport request in a scheduling log in response to the respective user accepting the upfront price.

3. The network computer system of claim 2, wherein the executed instructions further cause the one or more processors to determine the upfront price by (i) accessing a weather resource to determine likely weather conditions for the scheduled date and the scheduled time, and (ii) filtering the historical pricing data based on the likely weather conditions.

4. The network computer system of claim 2, wherein the executed instructions further cause the one or more processors to determine the upfront price by (i) accessing event schedules for the given region to determine whether a particular event will coincide with the scheduled transport request, and (ii) filtering the historical pricing data based on the event schedules.

5. The network computer system of claim 4, wherein the executed instructions further cause the one or more processors to:

input blackout periods in the scheduling log for certain areas of the given region based on the event schedules for the given region.

6. The network computer system of claim 1, wherein the notification includes an invitation message transmitted to the computing device of the accepting transport provider upon a determination that the accepting transport provider has a state indicating availability at the scheduled time, the invitation message indicating the pick-up location and the destination location of the scheduled transport request.

7. The network computer system of claim 1, wherein the executed instructions cause the one or more processors to further execute the second selection process by:

determining that the pick-up location is within an area of a given region that is correlated to low transport supply;

transmitting an incentive message to the computing devices of each of the set of proximate transport providers to travel to the pick-up location to fulfill the scheduled transport request; and associating the scheduled transport request to the backup transport provider based on the backup transport provider accepting an incentive associated with the incentive message.

8. The network computer system of claim 1, wherein the executed instructions cause the one or more processors to further execute the second selection process by:

transmitting respective notifications for the scheduled transport request to each of the computing devices of the set of proximate transport providers; and after not receiving an acceptance message for any of the respective notifications from the computing devices of any of the set of proximate transport providers, failing over to a second transport service option by transmitting a failover transport invitation for the scheduled transport request to e the computing device of a failover transport provider of the plurality of transport providers.

9. The network computer system of claim 8, wherein the plurality of transport service options comprises two or more of a peer-to-peer transport service option, a shared multiple-user service option, a luxury transport service option, a large vehicle transport service option, or a professional transport service option.

10. The network computer system of claim 1, wherein executed instructions cause the one or more processors to determine the specified time dynamically based on a transport provider network density within a certain proximity of the pick-up location.

11. The network computer system of claim 1, wherein the preselected location is a home location.

12. A non-transitory computer readable medium storing instructions that, when executed by one or more processors, cause the one or more processors to:

communicate, over one or more networks, with (i) computing devices of users of multiple users of a transport service, and (ii) computing devices of a plurality of transport providers of the transport service;

transmit, over the one or more networks, display data to the computing device of a respective user of the multiple users, the display data causing a designated application executing on the computing device of the respective user to generate a plurality of selection features on a user interface, each of the plurality of selection features corresponding to one of a plurality of transport service options of the transport service;

receive, over the one or more networks, a scheduled transport request from the computing device of the respective user, the scheduled transport request indicating (i) pick-up location, (ii) a destination location, (iii) a scheduled date and a scheduled time to transport the respective user from the pick-up location to the destination location, and (iv) a selected transport service option from the plurality of transport service options;

implement a hierarchical selection process to fulfill the scheduled transport request, wherein implementing the hierarchical selection process includes implementing a first selection process and a second selection process, the first selection process comprising:

determining a set of candidate transport providers of the plurality of transport providers to transport the respective user from the pick-up location to the destination location at the scheduled date and the scheduled time based, at least in part, on the preselected location of each candidate transport provider of the set of candidate transport providers;

transmitting a notification, over the one or more networks, to the computing device of each candidate transport provider;

receiving a confirmation message, over the one or more networks, from the computing device of an accepting transport provider of the set of candidate transport providers;

in response to receiving the confirmation message, associating the accepting transport provider with the scheduled transport request in a record database;

receiving, over the one or more networks, state data from the computing device of the accepting transport provider, the state data indicating that the accepting transport provider is unable to fulfill the scheduled transport request at the scheduled time;

upon determining that the accepting transport provider is unable to fulfill the scheduled transport request at the scheduled time, disassociating the accepting transport provider with the scheduled transport request in the record database; and at a specified time prior to the scheduled time, automatically implement the second selection process based on disassociating the accepting transport provider with the scheduled transport request, the second selection process comprising:
  receiving, over the one or more networks, location data indicating current locations of a set of proximate transport providers, of the plurality of transport providers, that are proximate to the pick-up location, the location data being received from a location-based resource of the computing device of each of the set of proximate transport providers;
  determining an estimated time of arrival (ETA) to the pick-up location for each of the set of proximate transport providers based at least on the location data;
  selecting a backup transport provider from the set of proximate transport providers based, at least in part, on the ETA of each of the set of proximate transport providers, and the scheduled time; and
  transmitting a transport invitation, over the one or more networks, to the computing device of the backup transport provider to enable the backup transport provider to fulfill the scheduled transport request at the scheduled time.

13. The non-transitory computer readable medium of claim 12, wherein the executed instructions further cause the one or more processors to:
  compile historical pricing data for individual transport services executed throughout a given region;
  in response to receiving the scheduled transport request, utilize the historical pricing data to determine an upfront price for the scheduled transport request, the upfront price being based at least in part on the scheduled date, the scheduled time, the pick-up location, and the destination location; and
  input the scheduled transport request in a scheduling log in response to the respective user accepting the upfront price.

14. The non-transitory computer readable medium of claim 13, wherein the executed instructions further cause the one or more processors to determine the upfront price by (i) accessing a weather resource to determine likely weather conditions for the scheduled date and the scheduled time, and (ii) filtering the historical pricing data based on the likely weather conditions.

15. The non-transitory computer readable medium of claim 14, wherein the executed instructions further cause the one or more processors to determine the upfront price by (i) accessing event schedules for the given region to determine whether a particular event will coincide with the scheduled transport request, and (ii) filtering the historical pricing data based on the event schedules.

16. The non-transitory computer readable medium of claim 15, wherein the executed instructions further cause the one or more processors to:
  input blackout periods in the scheduling log for certain areas of the given region based on the event schedules for the given region.

17. The non-transitory computer readable medium of claim 10, wherein the preselected location is a home location.

18. A computer-implemented method for implementing a transport service, the method being performed by one or more processors and comprising:
  communicating, over one or more networks, with (i) computing devices of users of multiple users of the transport service, and (ii) computing devices of a plurality of transport providers of the transport service;
  transmitting, over the one or more networks, display data to the computing device of a respective user of the multiple users, the display data causing a designated application executing on the computing device of the respective user to generate a plurality of selection features on a user interface, each of the plurality of selection features corresponding to one of a plurality of transport service options of the transport service;
  receiving, over the one or more networks, a scheduled transport request from the computing device of the respective user, the scheduled transport request indicating (i) a pick-up location, (ii) a destination location, (iii) a scheduled date and a scheduled time to transport the respective user from the pick-up location to the destination location, (iv) a selected transport service option from the plurality of transport service options; and
  implementing a hierarchical selection process to fulfill the scheduled transport request, wherein implementing the hierarchical selection process includes implementing a first selection process and a second selection process comprising:
    determining a set of candidate transport providers of the plurality of transport providers to transport the respective user from the pick-up location to the destination location at the scheduled date and the scheduled time based, at least in part, on the preselected location of each candidate transport provider of the set of candidate transport providers;
    transmitting a notification, over the one or more networks, to the computing device of each candidate transport provider;
    receiving a confirmation message, over the one or more networks, from the computing device of an accepting transport provider of the set of candidate transport providers;
    in response to receiving the confirmation message, associating the accepting transport provider with the scheduled transport request in a record database;
    receiving, over the one or more networks, state data from the computing device of the accepting transport provider, the state data indicating that the accepting transport provider is unable to fulfill the scheduled transport request at the scheduled time; and
    upon determining that the accepting transport provider is unable to fulfill the scheduled transport request at the scheduled time, disassociating the accepting transport provider with the scheduled transport request in the record database;
  at a specified time prior to the scheduled time, automatically executing the second selection process based on disassociating the accepting transport provider with the scheduled transport request, the second selection process comprising:
    receiving, over the one or more networks, location data indicating current locations of a set of proximate transport providers, of the plurality of transport providers, that are proximate to the pick-up location, the location data being received from a location-based resource of the computing device of each of the set of proximate transport providers;
    determining an estimated time of arrival (ETA) for each of the set of proximate transport providers based at least on the location data;
    selecting a backup transport provider from the set of proximate transport providers based, at least in part, on the ETA of each of the set of proximate transport providers, and the scheduled time; and transmitting a transport invitation, over the one or more networks, to the computing device of the backup transport provider to enable the backup transport provider to fulfill the scheduled transport request at the scheduled time.

\* \* \* \* \*